(12) United States Patent
Kim et al.

(10) Patent No.: US 8,423,078 B2
(45) Date of Patent: Apr. 16, 2013

(54) DUAL-MODE MOBILE TERMINAL IN A WIRELESS COMMUNICATION SYSTEM

(75) Inventors: Muryong Kim, Seoul (KR); Wonyong Yoon, Seoul (KR); Jong Hoon Lee, Gyeonggi-do (KR); Sang Won Lee, Seoul (KR); Haesoo Kim, Seoul (KR); Kwangil Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 450 days.

(21) Appl. No.: 12/717,813

(22) Filed: Mar. 4, 2010

(65) Prior Publication Data

US 2010/0227639 A1 Sep. 9, 2010

Related U.S. Application Data

(60) Provisional application No. 61/157,908, filed on Mar. 6, 2009.

(51) Int. Cl.
*H04M 1/00* (2006.01)

(52) U.S. Cl.
USPC ............. 455/552.1; 455/127.4; 455/436; 455/426.1

(58) Field of Classification Search ........... 455/426.1, 455/434, 435.1, 127.4, 436, 552.1, 432.1, 455/435.2, 553.1, 160.1, 452.2, 135, 161.3, 455/277.2
See application file for complete search history.

(56) References Cited

U.S. PATENT DOCUMENTS

| | | | |
|---|---|---|---|
| 6,853,844 B2 * | 2/2005 | Iwamura | 455/442 |
| 6,978,121 B1 * | 12/2005 | Lane et al. | 455/73 |
| 2005/0239510 A1 * | 10/2005 | Cho et al. | 455/562.1 |
| 2005/0250514 A1 * | 11/2005 | Chen et al. | 455/456.1 |
| 2007/0058579 A1 * | 3/2007 | Xu et al. | 370/328 |
| 2007/0066345 A1 * | 3/2007 | Hwang et al. | 455/553.1 |
| 2008/0049675 A1 * | 2/2008 | Burgan et al. | 370/331 |
| 2009/0023449 A1 * | 1/2009 | Kim et al. | 455/438 |
| 2009/0103496 A1 * | 4/2009 | Purkayastha et al. | 370/332 |

FOREIGN PATENT DOCUMENTS

| | | |
|---|---|---|
| CN | 101167266 | 4/2008 |
| CN | 101442393 | 5/2009 |
| JP | 2003078480 | 3/2003 |
| JP | 2005295516 | 10/2005 |
| JP | 2007019939 | 1/2007 |
| JP | 2007074491 | 3/2007 |
| JP | 2007129672 | 5/2007 |
| JP | 2008160247 | 7/2008 |
| JP | 2011505727 | 2/2011 |
| WO | 2009/065469 | 5/2009 |

* cited by examiner

Primary Examiner — Dominic E Rego
(74) Attorney, Agent, or Firm — Lee, Hong, Degerman, Kang & Waimey

(57) ABSTRACT

A dual mode communication terminal in accordance with one embodiment comprises a first communication module configured to communicate with a first base station; a second communication module configured to communicate with a second base station; a first antenna connected to the first communication module to communicate a first base station signal with a first base station; and a second antenna configured to communicate either the first base station signal with the first base station or to communicate a second base station signal with a second base station, the second antenna having a switching module to connect the second antenna to either the first communication module or the second communication module, wherein in response to receiving a command from the first base station, the first communication module measures quality of the second base station signal received from the second base station.

11 Claims, 10 Drawing Sheets

US 8,423,078 B2

DUAL-MODE MOBILE TERMINAL IN A WIRELESS COMMUNICATION SYSTEM

CROSS-REFERENCE TO RELATED APPLICATION

Pursuant to 35 U.S.C. §119(a), this application claims the benefit of earlier filing date and right of priority to U.S. Provisional Application 61/157,908, filed on Mar. 6, 2009, the contents of which is hereby incorporated by reference herein in its entirety.

RELATED FIELD

The present invention relates to a mobile terminal, and more particularly, to a dual mode mobile terminal and controlling method thereof. Although the present invention is suitable for a wide scope of applications, it is particularly suitable for receiving a long term evolution (LTE) signal in the course of measuring quality of a code division multiple access (CDMA) signal.

BACKGROUND

A dual mode mobile terminal refers to a mobile terminal capable of supporting two types of wireless communications protocols. The dual mode mobile terminal is mainly used in an area whether heterogeneous communication networks coexist. As a representative example of the dual mode mobile terminal, a mobile terminal available for both LTE wireless communication and CDMA wireless communication is very popular. Although a dual mode mobile terminal capable of communicating with both LTE network and CDMA network are taken as an example for the present invention, it is apparent to those skilled in the art that the present disclosure is applicable to other species of wireless communication systems.

In the LTE wireless communication, a multiple input multiple output or MIMO scheme for transmitting and receiving signals using a plurality of transmitting antennas and a plurality of receiving antennas is adopted. Once the MIMO scheme is adopted, a transmitting or receiving stage is able to increase capacity and enhance performance using a plurality of antennas. Moreover, the CDMA wireless communication utilizes multiple antennas for diversity scheme since EV-DO REV. A. In this disclosure, MIMO is indicative of the use of more than one antennas.

In order to receive one whole message, MIMO system does not depend on a single antenna path. Instead, in the MIMO system, data is completed by collecting and combining data fragments received via plural antennas together. If the MIMO system is used, data rate can be improved within a cell area having a specified size. System coverage may be also improved, while securing a specific data rate. Moreover, the MIMO system is widely applicable to a mobile communication terminal, a relay and the like. According to the MIMO system, it is able to overcome the limited transmission traffic in mobile communication of the related art having used a single antenna.

Meanwhile, in a dual mode terminal of the related art, it may cause a problem that transmission/reception of LTE signals is interrupted in a specific situation due to the limitation put on the number of antennas loadable in one terminal device. FIG. 1 is a diagram for explaining a problem that may be caused by a general dual mode terminal.

Referring to FIG. 1, when a terminal, that is communicating with an LTE network, attempts switch to communicate with a CDMA network, it stops receiving LTE signal from a base station (eNodeB) and then measures the quality of the available CDMA signal. In this case, the quality of the CDMA signal is measured based on eHRPD (enhanced high-rate packet data) which is a new version of 1xEV-DO upper layer protocol stack developed by 3GPP2 Standard committee to prepare for the wireless communication network interoperability with LTE.

The time spent to do the CDMA signal quality measurement is referred to as a measurement gap. This measurement gap is the length of interruption of reception/transmission of LTE signal. The frequency efficiency of the LTE suffers if the measurement gap is long.

SUMMARY

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

A dual mode communication terminal in accordance with one embodiment comprises a first communication module configured to communicate with a first base station; a second communication module configured to communicate with a second base station; a first antenna connected to the first communication module to communicate a first base station signal with a first base station; and a second antenna configured to communicate either the first base station signal with the first base station or to communicate a second base station signal with a second base station, the second antenna having a switching module to connect the second antenna to either the first communication module or the second communication module, wherein in response to receiving a command from the first base station, the first communication module measures quality of the second base station signal received from the second base station, while receiving the first base station signal from the first base station over the first antenna and the second antenna, wherein a switching module switches the second antenna to the second communication module from the first communication module.

Optionally, if the second antenna is switched to the second communication module, the first communication module receives the first base station signal using the first antenna and the second communication module performs a quality measurement of the second base station signal using the second antenna. When the quality measurement of the second base station signal is completed, the switching module switches the second antenna to the first communication module from the second communication module. The first base station comprises a long term evolution (LTE) base station. In the course of receiving the first base station signal using the first antenna and the second antenna, the first communication module reports a rank indicator (RI) as N to the LTE base station and selects to report a precoding matrix index (PMI) based on a layer N. If the command for measuring the quality of the second base station signal is received from the LTE base station, the first communication module reports the RI as M to the LTE base station and selects to report the PMI based on a layer M.

In one embodiment, if the first communication module receives the command for measuring the quality of the second base station signal from the LTE base station, the first communication module lowers and reports a channel quality indicator (CQI) index to receive a signal having a block error rate (BLER) set to a value equal to or smaller than approximately 0.1 via the first antenna from the LTE base station. While the second communication module is performing the quality measurement of the second base station signal, the first communication module receives an LTE signal from the LTE base station using the first antenna and wherein the LTE signal is a signal generated at a modulation and coding scheme (MCS) level changed in consideration of the reported CQI index. If the second communication module completes the quality measurement of the second base station signal, the first communication module reports the RI as N to the LTE base station and selects to report the PMI based on the layer N. The first communication module receives a signal transmitted at the changed MCS level from a second timing point after expiration of a setting time for decoding the LTE signal via the first antenna from a first timing point of reporting the RI as 1 to the LTE base station. The second communication module performs the quality measurement of the second base station signal from a third timing point after expiration of a switching time of the second antenna from the second timing point.

In accordance with one embodiment, a method of controlling a dual mode terminal in an multiple input multiple output (MIMO) wireless communication system is provided. The method comprises receiving a long term evolution (LTE) signal using a first antenna and a second antenna; receiving a command for initiating a quality measurement of a code division multiple access (CDMA) signal from an LTE base station; reporting at least one information for receiving the LTE signal via the first antenna to the LTE base station; performing the quality measurement of the CDMA signal via the second antenna upon receiving the LTE signal, using the first antenna; and receiving the LTE signal using the first antenna and the second antenna, when the quality measurement of the CDMA signal is completed.

At least one information includes information indicating that a rank indicator (RI) is 1, a precoding matrix index (PMI) is selected based on a layer 1, and a channel quality indicator (CQI) index is reduced to receive the LTE signal from the LTE base station using the first antenna only, wherein the LTE signal has a block error rate (BLER) set to a value equal to or smaller than approximately 0.1. The LTE signal received via the first antenna only is generated using a modulation and coding scheme (MCS) level changed by the LTE base station in consideration of the reported CQI index.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE EXAMPLE EMBODIMENTS

Reference will now be made in detail to one or more embodiments, examples of which are illustrated in the accompanying drawings. In the following detailed description, details are included to help the full understanding of the claimed subject matter. Yet, it is apparent to those skilled in the art that the embodiments can be implemented without these details. For instance, although the following descriptions are made in detail on the assumption that a wireless mobile communication system includes 3GPP LTE system, they are applicable to other mobile communication systems as well. Where possible, the same reference numbers will be used throughout the drawings to refer to the same or like parts.

In the following, the term terminal refers to a mobile or a device such as a user equipment (UE), a mobile station (MS) and the like and the term base station refers to a random node of a network communicating with a terminal as a node B, eNode B, a base station and the like.

Figure 1:
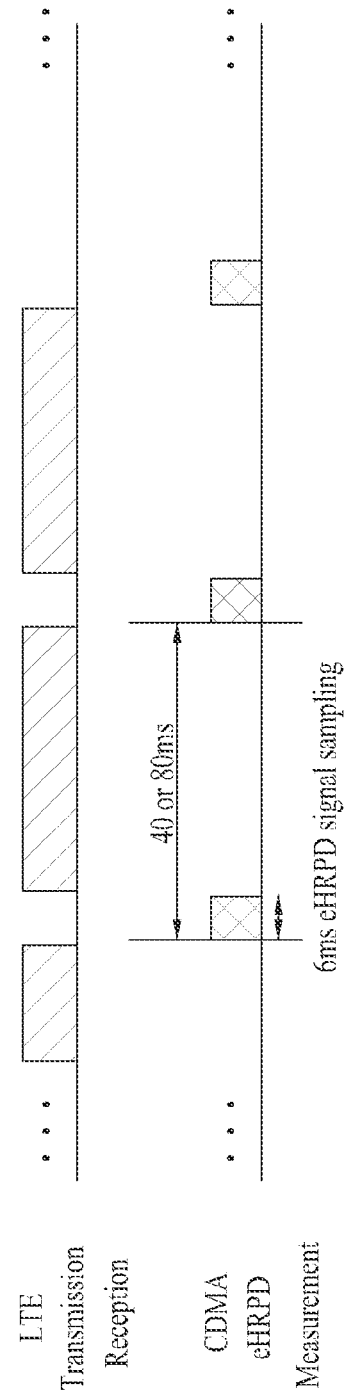
FIG. 1 is a signal diagram of a general dual mode terminal.
Figure 2:
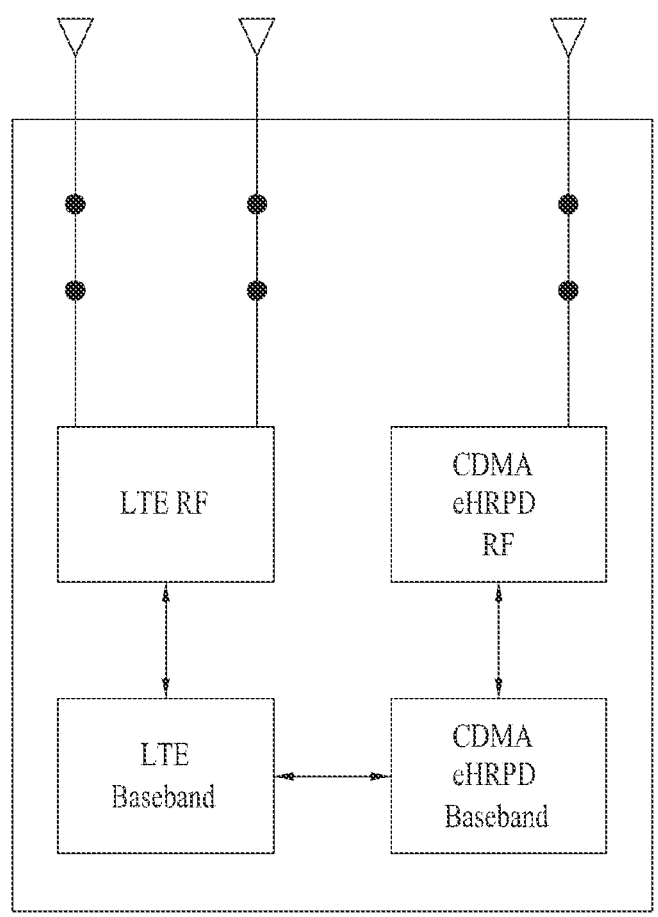
FIG. 2 is a block diagram of selected components of an example dual mode terminal.
Figure 3:
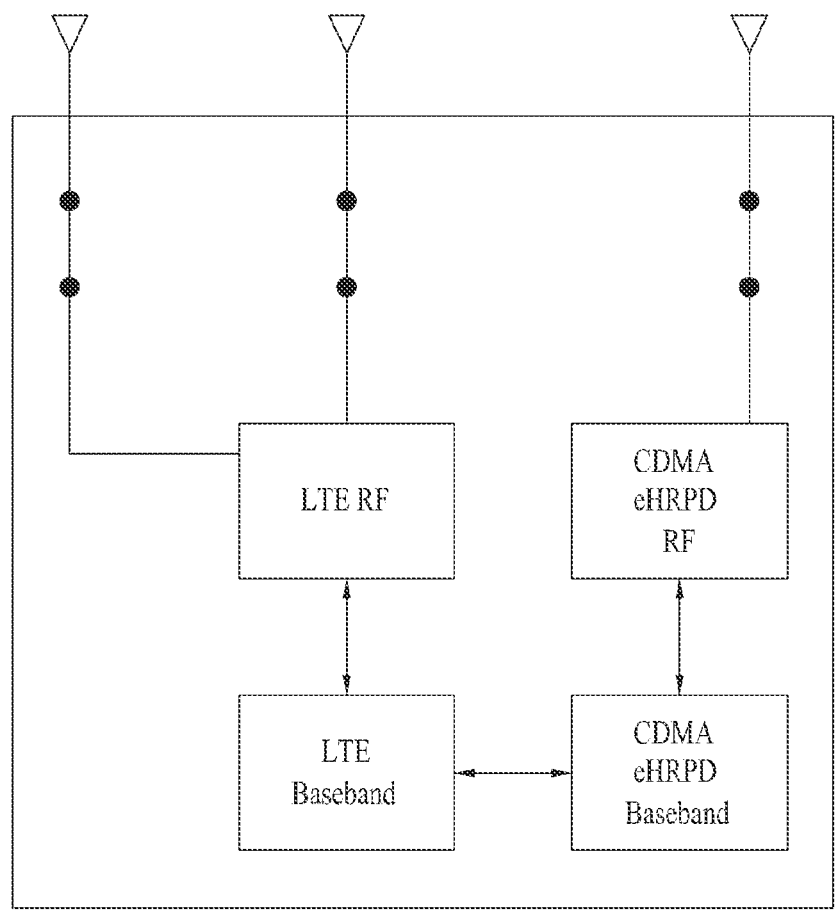
FIG. 3 is a block diagram of selected components of another example dual mode terminal.
Figure 4:
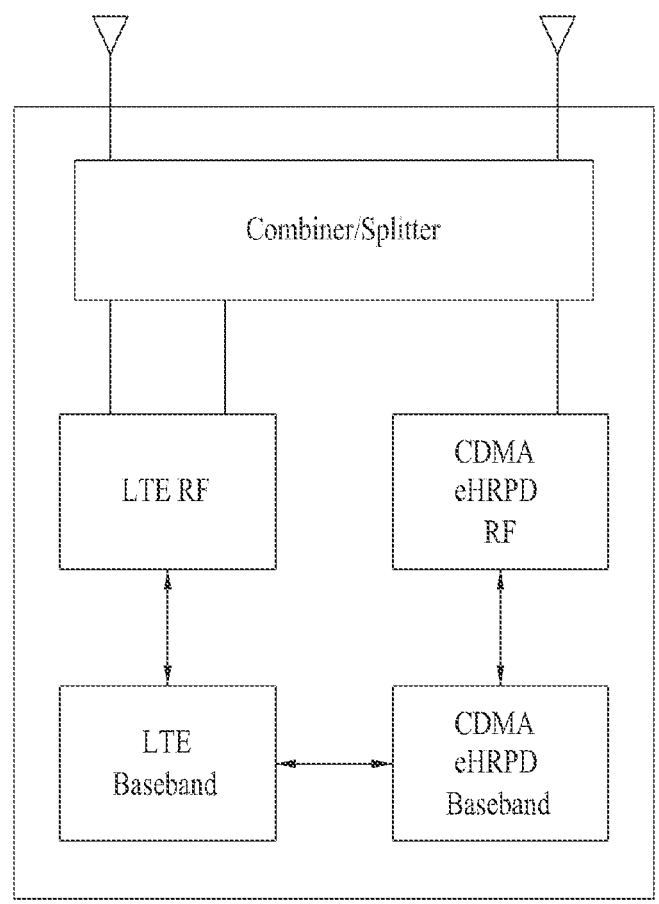
FIG. 4 is a block diagram of selected components of yet another example dual mode terminal.

Referring to the figures, a mobile terminal may be configured to measure quality of CDMA signal by avoiding the generation of a measurement gap. A single antenna for transmission/reception of CDMA signal is shown in FIGS. 2 to 4, and indicates an antenna for a quality measurement of CDMA signal. Since a diversity antenna function is supported over CDMA EVDO rev. A, at least two antennas can be provided for the transmission/reception of CDMA signal.

Referring to FIG. 2, in order to block generation of a measurement gap, it can be observed that an antenna for transceiving LTE signals is separately included. Since a quality measurement of CDMA signal is performed without depending on transmission/reception of LTE signal, a measurement gap is not generated. Yet, as a number of antennas are loaded in a limited space of a terminal device, the inter-antenna interference increases.

Referring to FIG. 3, probability of generation of inter-antenna interference is lowered by increasing the size of the terminal device. This increase is insufficient, however, to satisfy the design aspect requirements for maintaining the size of the mobile terminal as compact as possible.

Figure 5:
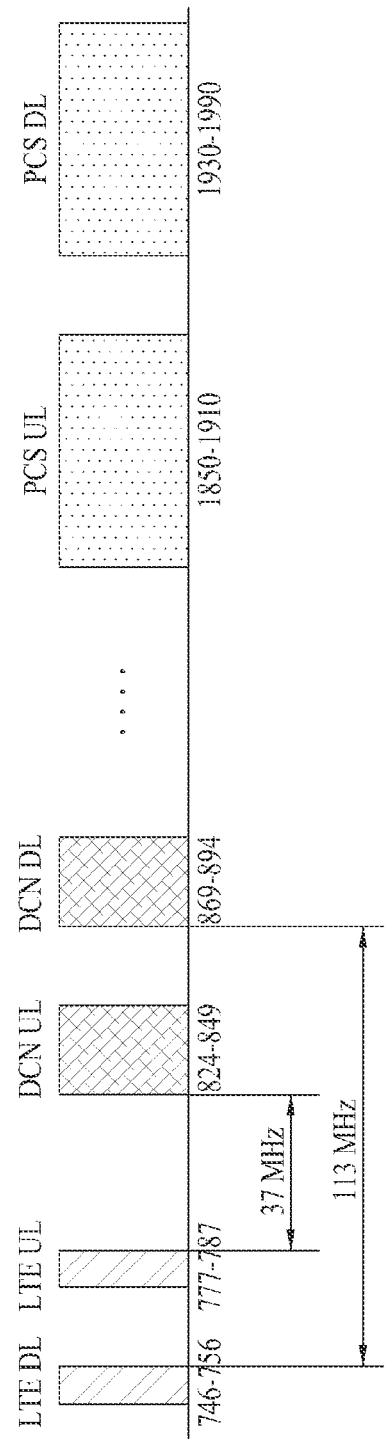
FIG. 5 is a diagram of frequency bandwidths serviced by a wireless communication service provider.

Referring to FIG. 4, a terminal is characterized in adopting a high-precision combiner/splitter capable of precisely discriminate a CDMA uplink signal and an LTE downlink signal from each other. However, since a gap between a CDMA DCN (data core network) UL (uplink) band and an LTE UL band by certain mobile communication service providers (e.g., Verizon Communications, U.S.A., see FIG. 5) is narrowly set to 37 MHz, it is considerably difficult for a current technology to implement a high-precision combiner/splitter capable of discriminating a CDMA DCN UL band and an LTE UL band from each other. Even if the implementation of the high-precision combiner/splitter is possible, the product cost will not be realistic.

Figure 6:
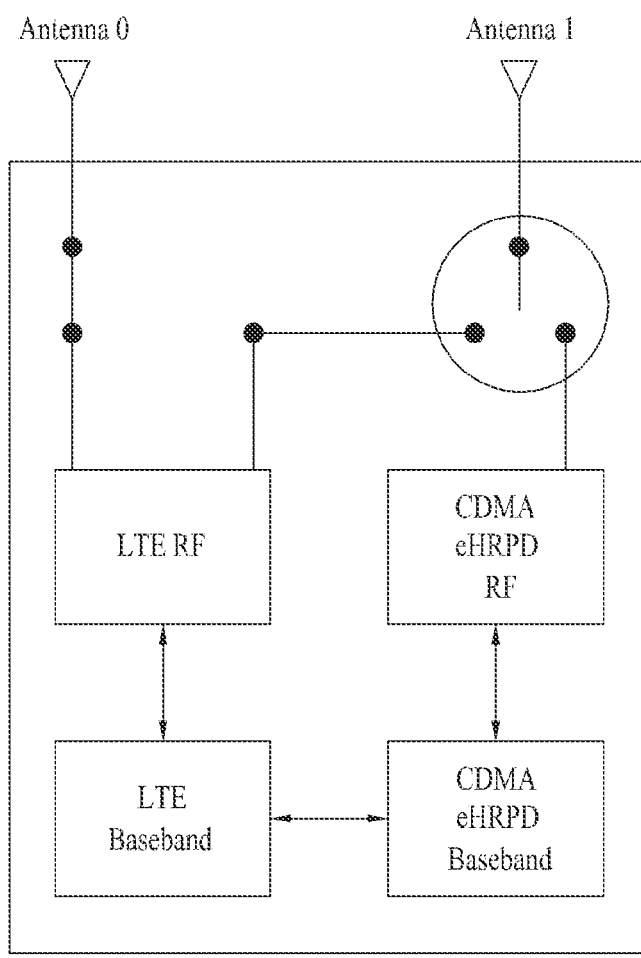
FIG. 6 is a block diagram of selected components of an example dual mode terminal, in accordance with one embodiment.

Accordingly, a dual mode terminal for performing a CDMA signal quality measurement without a measurement gap by non-changing LTE or CDMA specifications is proposed in FIG. 6. As shown, an antenna 0 of a dual mode terminal according to an embodiment is an LTE signal dedicated antenna. Antenna 1 is able to perform transmission/reception of LTE or CDMA signals via switching. While measuring a CDMA signal using the antenna 1, the terminal is characterized in performing transmission/reception of the LTE signal via the antenna 0. As such, strict timing synchronization between LTE and CDMA networks may not be needed.

Figure 7:
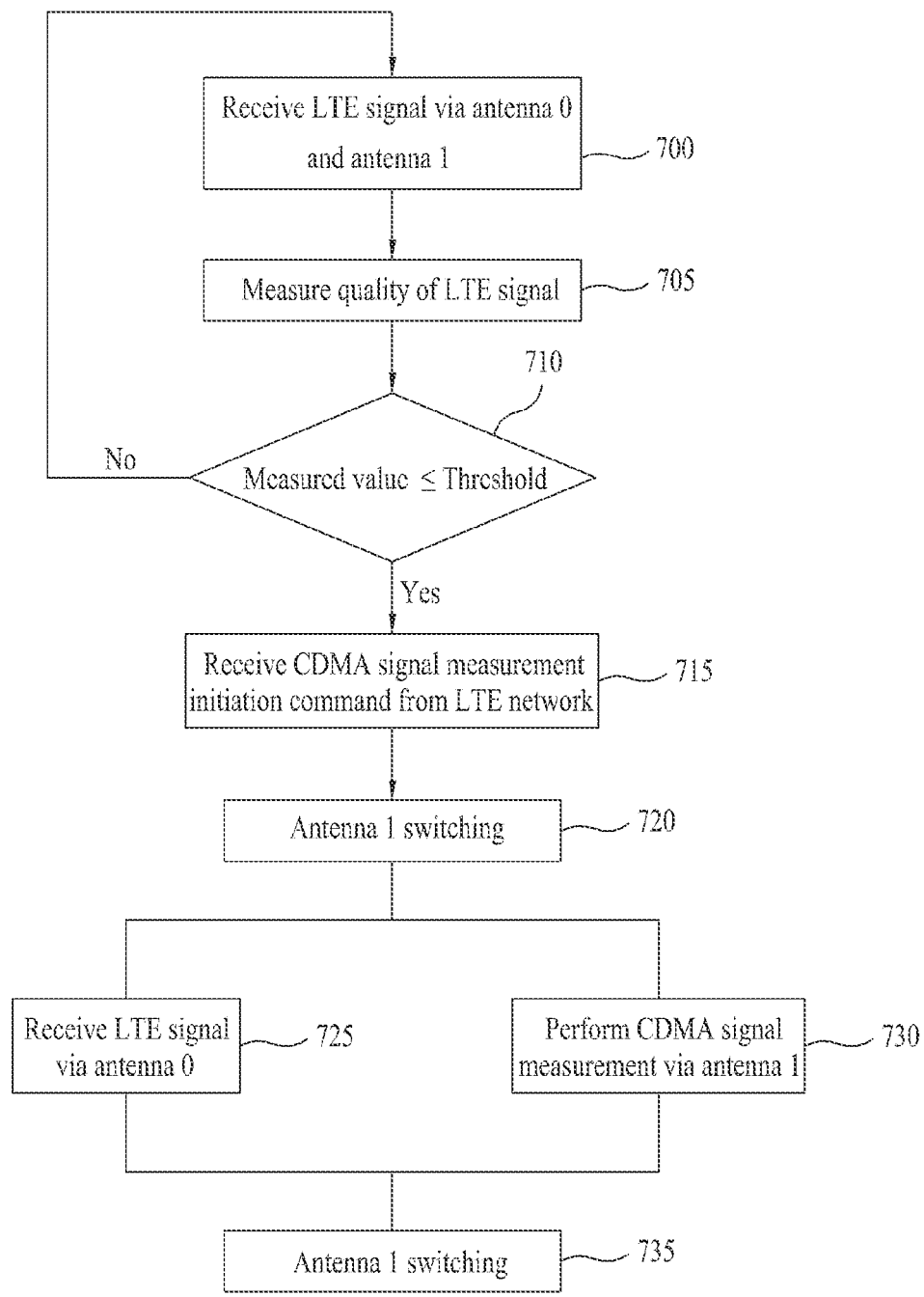
FIG. 7 is a flow diagram if an operating process of a dual mode terminal according to one embodiment.

FIG. 7 is a flowchart of the operations performed in a dual mode terminal according to an embodiment, for example, when a terminal connected to an LTE network measures a CDMA signal to make a handover into a CDMA network. Referring to FIG. 7, in process 700, a terminal receives LTE signals via both of the antenna 0 and the antenna 1. The terminal measures a quality of the LTE signal periodically or non-periodically in process 705.

In process 710, the terminal determines whether the measured LTE signal quality is equal to or smaller than a threshold. If the measured LTE signal quality exceeds the threshold, the terminal goes back to process 700 and then receives LTE signals via the antenna 0 and the antenna 1 both. If the measured LTE signal quality is equal to or smaller than the threshold, the LTE network transmits a command for the terminal to initiate a CDMA signal quality measurement. In process 715, the terminal receives this command. Subsequently, in process 720, the antenna 1 is switched to be connected to a CDMA modem from an LTE modem.

In one embodiment, the terminal keeps receiving LTE signals using the antenna 0 (see process 725) and desirably simultaneously performs the measurement of the CDMA signal quality using the antenna 1 in process 730. After completion of the measurement of the CDMA signal quality, the antenna 1 is switched to the LTE modem from the CDMA modem again. The CDMA modem then delivers the measurement result to the LTE modem. This measurement result is reported to an LTE base station through an appropriate process in the LTE modem.

As mentioned in the foregoing, when the dual mode terminal receives LTE signals via the antenna 0, a base station performs MIMO transmission via a single layer and transmits a signal by reflecting an SNR loss due to using a single antenna despite suffering performance decrease. The base station recognizes that the terminal receives LTE signals using the single antenna and then transmits signals in consideration of the LTE signal reception using the single antenna. For this, the present invention proposes a terminal to perform a CQI/PMI/RI (channel quality indicator/precoding matrix index/rank indicator) overwriting scheme.

According to the CQI/PMI/RI overwriting, if there are two proper ranks actually measured by a terminal, a report to a base station is temporarily made via rank 1. And, an index of a precoding matrix of Layer 1 in Table 1 is selected and transmitted on the assumption that PMI is rank 1 as well. In this case, the layer indicates each different information sent by MIMO system. In one embodiment, the number of layers may not be greater than a rank that corresponds to the maximum number for sending different informations. This can be expressed as #of Layers$\leq$rank(H)$\leq$min (N$_T$, N$_R$). In this case, H indicates a channel matrix, N$_T$ indicates the number of transmitting antennas, and N$_R$ indicates the number of receiving antennas.

TABLE 1

| Codebook Index | Number of layers $\upsilon$ | |
|---|---|---|
| | 1 | 2 |
| 0 | $\frac{1}{\sqrt{2}}\begin{bmatrix}1\\1\end{bmatrix}$ | $\frac{1}{\sqrt{2}}\begin{bmatrix}1 & 0\\0 & 1\end{bmatrix}$ |
| 1 | $\frac{1}{\sqrt{2}}\begin{bmatrix}1\\-1\end{bmatrix}$ | $\frac{1}{2}\begin{bmatrix}1 & 1\\1 & -1\end{bmatrix}$ |
| 2 | $\frac{1}{\sqrt{2}}\begin{bmatrix}1\\j\end{bmatrix}$ | $\frac{1}{2}\begin{bmatrix}1 & 1\\j & -j\end{bmatrix}$ |
| 3 | $\frac{1}{\sqrt{2}}\begin{bmatrix}1\\-j\end{bmatrix}$ | — |

Regarding CQI, in order to meet a block error rate (hereinafter abbreviated BLER) equal to or smaller than 0.1 with reference to Table 2, a CQI index lower than that in transmission via two antennas is reported.

TABLE 2

| MCS Index | Modulation Order | TBS Index | TBS | Coded Bits | Code Rate | Code Rate × 1024 | Efficiency | CQI Index |
|---|---|---|---|---|---|---|---|---|
| 0 | 2 | 0 | 1384 | 13200 | 0.104848 | 107.3648 | 0.209697 | 2 |
| 1 | 2 | 1 | 1600 | 13200 | 0.136364 | 139.6364 | 0.272727 | 2 |
| 2 | 2 | 2 | 2216 | 13200 | 0.167879 | 171.9079 | 0.335768 | 3 |
| 3 | 2 | 3 | 2856 | 13200 | 0.216364 | 221.5564 | 0.432727 | 3 |
| 4 | 2 | 4 | 3624 | 13200 | 0.274648 | 281.1345 | 0.549091 | 4 |
| 5 | 2 | 5 | 4392 | 13200 | 0.332727 | 340.7127 | 0.665465 | 4 |
| 6 | 2 | 6 | 5160 | 13200 | 0.390909 | 400.2909 | 0.781818 | 5 |
| 7 | 2 | 7 | 6200 | 13200 | 0.469697 | 480.9697 | 0.939394 | 5 |
| 8 | 2 | 8 | 6988 | 13200 | 0.527879 | 540.5479 | 1.066788 | 6 |
| 9 | 2 | 9 | 7992 | 13200 | 0.605455 | 619.9855 | 1.210909 | 6 |
| 10 | 4 | 9 | 7992 | 26400 | 0.302727 | 309.9927 | 1.210909 | 7 |
| 11 | 4 | 10 | 8760 | 26400 | 0.331818 | 339.7818 | 1.327273 | 7 |
| 12 | 4 | 11 | 9912 | 26400 | 0.378466 | 384.4665 | 1.601818 | 7 |
| 13 | 4 | 12 | 11448 | 26400 | 0.433636 | 444.0436 | 1.734545 | 8 |
| 14 | 4 | 13 | 12960 | 26400 | 0.490909 | 502.6909 | 1.963636 | 8 |
| 15 | 4 | 14 | 14112 | 26400 | 0.634646 | 647.3745 | 2.138182 | 8 |
| 16 | 4 | 15 | 15284 | 26400 | 0.578491 | 592.0582 | 2.312727 | 9 |

TABLE 2-continued

| MCS Index | Modulation Order | TBS Index | TBS | Coded Bits | Code Rate | Code Rate x 1024 | Efficiency | CQI Index |
|---|---|---|---|---|---|---|---|---|
| 17 | 6 | 15 | 15284 | 39600 | 0.385455 | 394.7055 | 2.312727 | 10 |
| 18 | 6 | 16 | 16418 | 39600 | 0.414545 | 424.4945 | 2.487278 | 10 |
| 19 | 6 | 17 | 15338 | 39600 | 0.46303 | 474.143 | 2.778182 | 10 |
| 20 | 6 | 18 | 19848 | 39600 | 0.601212 | 613.2412 | 3.007273 | 10 |
| 21 | 6 | 19 | 21384 | 39600 | 0.54 | 562.96 | 3.24 | 11 |
| 22 | 6 | 20 | 22920 | 39600 | 0.678788 | 692.6788 | 3.472727 | 11 |
| 23 | 6 | 21 | 25456 | 39600 | 0.642828 | 868.2662 | 3.85697 | 12 |
| 24 | 6 | 22 | 27378 | 39600 | 0.691313 | 707.9046 | 4.147879 | 12 |
| 25 | 6 | 23 | 28336 | 39600 | 0.715556 | 732.7269 | 4.293333 | 13 |
| 26 | 6 | 24 | 30676 | 39600 | 0.772121 | 790.6621 | 4.632727 | 13 |
| 27 | 6 | 25 | 31704 | 39600 | 0.800606 | 819.8206 | 4.803636 | 14 |
| 28 | 6 | 26 | 36696 | 39600 | 0.826667 | 948.9067 | 5.66 | 15 |

Having received a report of the CQI index, an LTE base station temporarily changes a MCS (Modulation and Coding Scheme) value based on the reported CQI index and then temporarily transmits a DL signal via one layer based on the reported RI and PMI. This CQI/PMI/RI overwriting scheme is explained in detail with reference to the accompanying drawing as provided below.

Figure 8:
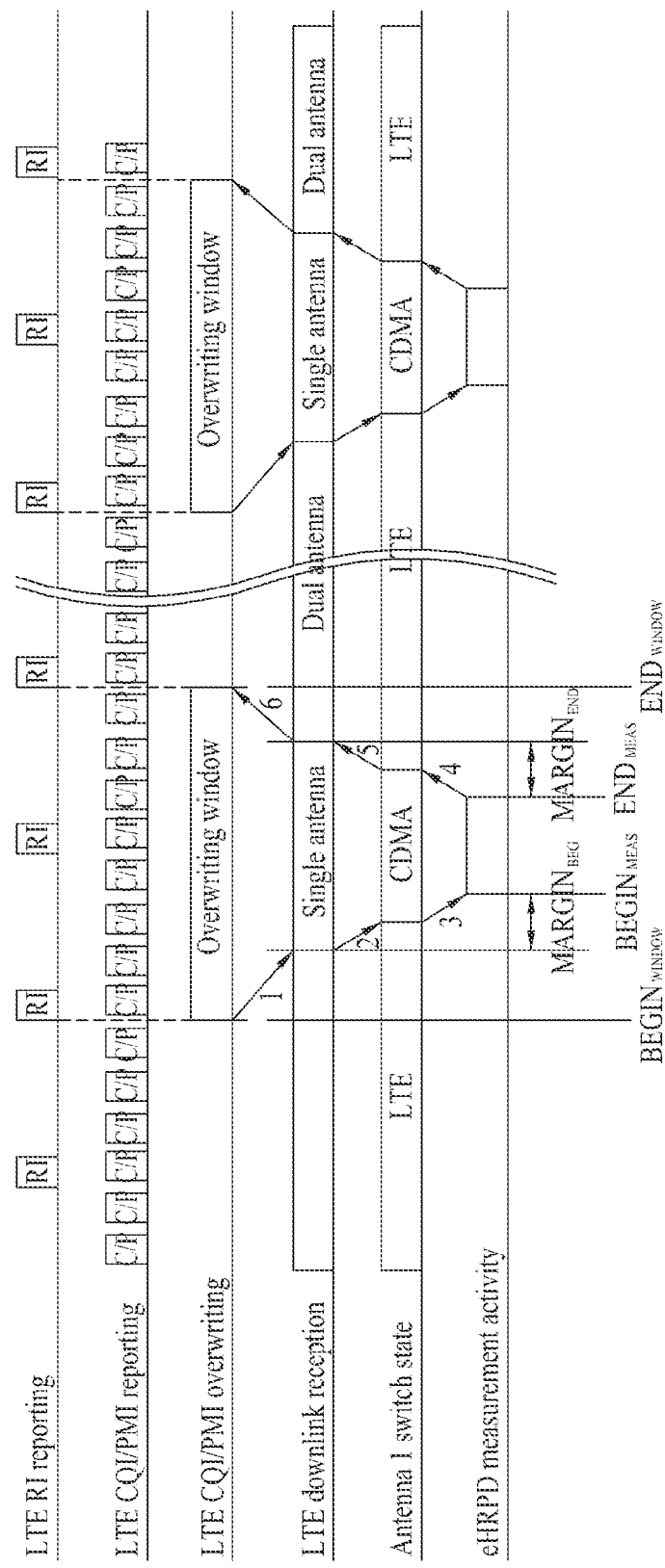
FIG. 8 is a diagram for explaining CQI/PMI/RI overwriting scheme for a terminal according to one embodiment.

FIG. 8 is a diagram for explaining CQI/PMI/RI overwriting scheme for a terminal according to one embodiment. In FIG. 8, assume that a CQI/PMI report cycle of a terminal is 20 ms, that an RI report cycle is 80 ms, and that a measurement time of CDMA signal quality, i.e., a measurement duration is 60 ms. In transmitting a command for enabling a terminal to measure a CDMA signal quality, an LTE base station orders the terminal to set an overwriting window having a sufficient time margin.

In FIG. 8, $BEGIN_{MEAS}$ and $END_{MEAS}$ indicate a start time of a CDMA signal quality measurement and an end time thereof, respectively. $MARGIN_{BEG}$ indicates a difference between a start timing point of receiving an LTE signal via a single antenna and a start timing point of a CDMA signal quality measurement and is provided for the preparation of a process for antenna switching and CDMA signal quality measurement. $MARGIN_{END}$ indicates a difference between an end timing point of the CDMA signal quality measurement and an end timing point of the LTE signal reception via the single antenna and is also provided for the end of the process for the CDMA signal quality measurement and the antenna switching. Besides, $MARGIN_{BEG}$ and $MARGIN_{END}$ may not be included in the overwriting window.

$BEGIN_{WINDOW}$ indicates a start timing point of the overwriting window and preferably includes a timing point of reporting RI finally prior to $MARGIN_{BEG}$ in $BEGIN_{MEAS}$. $END_{WINDOW}$ indicates an end timing point of the overwriting window and preferably includes a timing point of reporting RI initially after $MARGIN_{END}$ in $END_{MEAS}$.

Referring to FIG. 8, a dual mode terminal receives a CDMA signal quality measurement command. Subsequently, the dual mode terminal reports an RI as '1' and simultaneously sets an overwriting window. In doing so, the dual mode terminal selectively reports on the assumption of RI 1. And, the dual mode terminal also makes a report in a manner that a BLER is set smaller than 0.1.

During a time margin of a reference index, the terminal makes a preparation for decoding an LTE signal via a single antenna and then receives LTE signals via an antenna 0 thereafter. In this case, it is preferable that LTE signals received via an antenna 1 are ignored. During a time margin to a reference index 2, the terminal completes antenna switching. During a time margin of a reference index 3, the mobile terminal drives a process for a CDMA signal quality measurement. The terminal then performs the CDMA signal quality.

Reference indexes 4 to 6 indicate time margins corresponding to the reference indexes 3 to 1, respectively. In particular, the reference index 4 indicates a time margin for an end of the process for the CDMA signal quality measurement. The reference index 5 indicates a time margin for the antenna switching. And, the reference index 6 indicates a preparation period for decoding LTE signals via two antennas.

As mentioned in the foregoing description, the LTE base station works according to the conventional standard document. In particular, the LTE base station changes a MCS level based on the CQI reported by the terminal and then transmits a DL signal via one layer only based on the reported RI and PMI.

Figure 9:
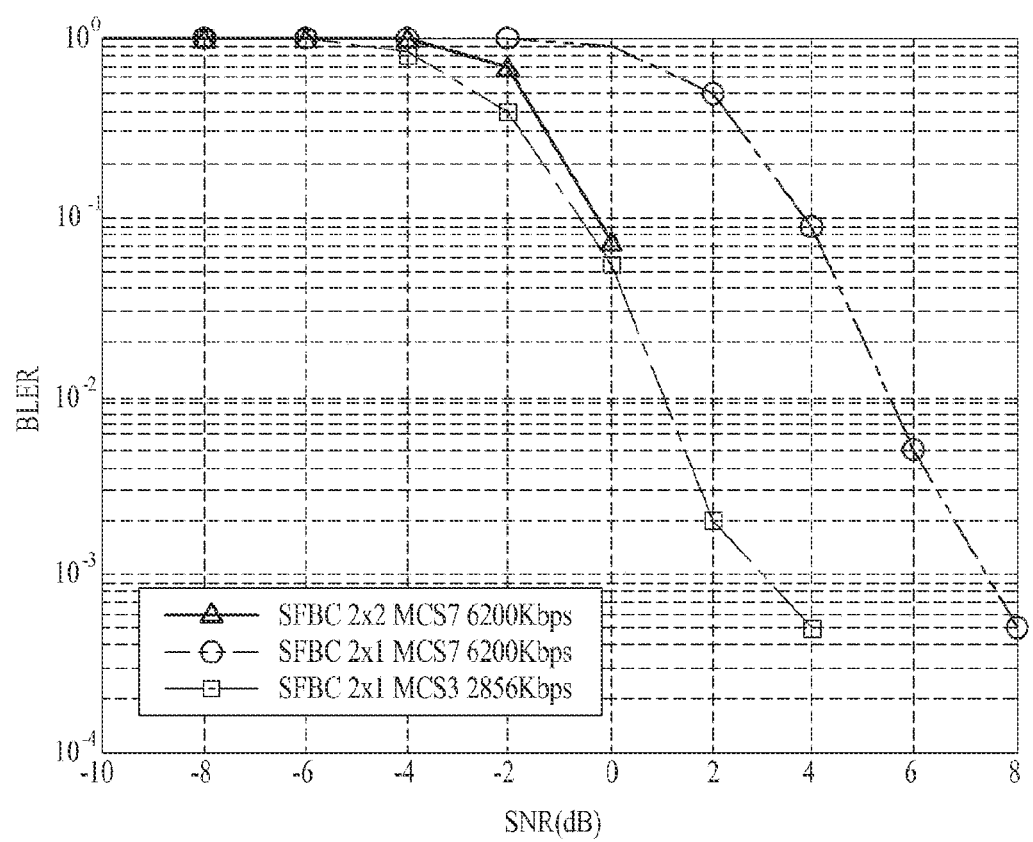
FIG. 9 is a diagram for explaining performance of a dual mode terminal and controlling method thereof according to one embodiment.

FIG. 9 is a diagram for explaining performance of a dual mode terminal and controlling method thereof according to an embodiment of the present invention. In FIG. 9, assume that an LTE base station having two antennas transmits a DL signal to a single user by a transmit diversity scheme.

Referring to FIG. 9, shown are a BLER value of a case that an LTE base station performs a transmission in a manner that an SNR of a DL signal is set to 0 dB, a BLER value of a case that a terminal receives an LTE signal via two antennas, a BLER value of a case that the terminal receives an LTE signal using one of the two antennas without a MCS level change of the base station, and a BLER value of a case that a terminal receives an LTE signal via one antenna with a MCS level change made by a base station.

In particular, a base station transmits an LTE signal with a MCS level 7 (CQI index 5) using SFBC (space frequency block coding) scheme among transmission diversity schemes and a terminal then receives the LTE signal via two antennas. In this case, a BLER has a value set equal to or smaller than 0.1. If the terminal receives the LTE signal via a single antenna, the BLER is incremented close to 1. Yet, if the terminal provides the base station with information using the CQI/PMI/RI overwriting scheme and then transmits an LTE signal with a MCS level 3 (CQI index 3), it can be observed that the BLER becomes similar to that of the case of the reception via two antennas.

It is necessary to examine how much a performance drop width will become if a base station changes a MCS level. Assuming that a time of receiving an LTE signal via a single antenna is 100 ms and that a measurement cycle is 480 ms, it can be observed that an average data rate is 5,503 kbps and that the performance drop width becomes 11.24%.

Figure 10:
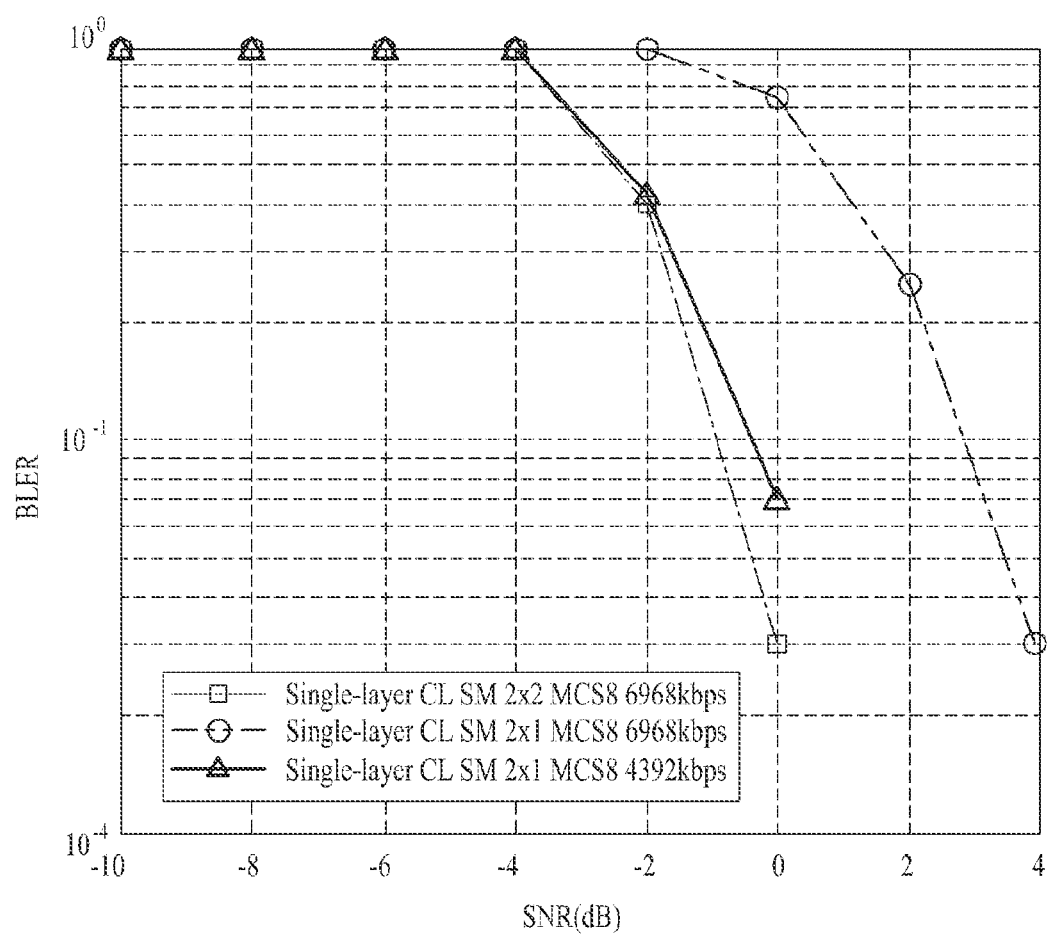
FIG. 10 is another diagram for explaining performance of a dual mode terminal and controlling method in accordance with one embodiment.

FIG. 10 is another diagram for explaining performance of a dual mode terminal and controlling method thereof according to an embodiment of the present invention. In FIG. 10, assume that an LTE base station transmits a DL signal to a single user by a closed-loop Spatial Multiplexing (SM) scheme.

In particular, a base station transmits an LTE signal with a MCS level 8 (CQI index 6) and a terminal then receives the LTE signal via two antennas. In this case, a BLER has a value set equal to or smaller than 0.1. If the terminal receives the LTE signal via a single antenna, the BLER is incremented close to 1. Yet, if the terminal provides the base station with information using the CQI/PMI/RI overwriting scheme and then transmits an LTE signal with a MCS level 5 (CQI index 4), it can be observed that the BLER becomes similar to that of the case of the reception via two antennas.

Assuming that a time of receiving an LTE signal via a single antenna is 100 ms and that a measurement cycle is 480 ms, it can be observed that an average data rate is 4,392 kbps and that the performance drop width becomes 7.7% if a base station changes a MCS level. Accordingly, where a slight performance drop is acceptable, a CDMA signal quality measurement can be performed in the course of keeping receiving LTE signals without a measurement gap.

It will be apparent to those skilled in the art that various modifications and variations can be made without departing from the spirit or scope of the claimed subject matter. Thus, it is intended that the claimed subject matter covers the modifications and variations of this invention provided they come within the scope of the appended claims and their equivalents.

What is claimed is:

1. A dual-mode communication terminal comprising:
   a first communication module configured to communicate with a first base station that is a long term evolution (LTE) base station;
   a second communication module configured to communicate with a second base station;
   a first antenna connected to the first communication module in order to receive a first base station signal from the LTE base station; and
   a second antenna configured to receive either the first base station signal from the first base station or to receive a second base station signal from the second base station, the second antenna comprising a switching module configured to connect the second antenna to either the first communication module or the second communication module,
   wherein the first communication module is further configured to measure quality of the second base station signal received from the second base station in response to receiving a command from the LTE base station,
   wherein the quality of the second base station signal is measured while receiving the first base station signal from the LTE base station via the first and second antennas,
   wherein the switching module is further configured to switch the second antenna between the first communication module and the second communication module, and
   wherein the first communication module is further configured to:
      report a rank indicator (RI) as N to the LTE base station, and
      report a precoding matrix index (PMI) based on a layer N while the first base station signal is received via the first and second antennas.

2. The dual-mode terminal of claim 1, wherein:
   the first communication module is further configured to receive the first base station signal via the first antenna; and
   the second communication module is further configured to perform a quality measurement of the second base station signal received via the second antenna when the second antenna is switched from the first communication module to the second communication module.

3. The dual-mode terminal of claim 1, wherein the switching module is further configured to switch the second antenna from the second communication module to the first communication module when the quality measurement of the second base station signal is complete.

4. The dual-mode terminal of claim 1, wherein the first communication module is further configured to report the RI as M to the LTE base station and report the PMI based on a layer M when the command for measuring the quality of the second base station signal is received from the LTE base station.

5. The dual-mode terminal of claim 4, wherein the first communication module is further configured to lower and report a channel quality indicator (CQI) index in order to receive a signal having a block error rate (BER) set to a value that is equal to or less than approximately 0.1 via the first antenna from the LTE base station when the command is received by the first communication module for measuring the quality of the second base station signal received from the LTE base station.

6. The dual-mode terminal of claim 5, wherein:
   the first communication module is further configured to receive an LTE signal from the LTE base station via the first antenna while the second communication module is performing the quality measurement of the second base station signal; and
   the LTE signal is a signal that is generated at a modulation and coding scheme (MCS) level that is changed based on the reported CQI index.

7. The dual-mode terminal of claim 6, wherein the first communication module is further configured to report the RI as N to the LTE base station and report the PMI based on the layer N when the second communication module completes the quality measurement of the second base station signal.

8. The dual-mode terminal of claim 6, wherein the first communication module is further configured to receive a signal transmitted at the changed MCS level from a first timing point to a second timing point after expiration of a setting time for decoding the LTE signal via the first antenna for reporting the RI as 1 to the LTE base station.

9. The dual-mode terminal of claim 8, wherein the second communication module is further configured to perform the quality measurement of the second base station signal from the second timing point to a third timing point after expiration of a switching time of the second antenna.

10. A method of controlling a dual-mode terminal in a multiple input multiple output (MIMO) wireless communication system, the method comprising:
    receiving a long term evolution (LTE) signal via first and second antennas;
    receiving a command for initiating a quality measurement of a code division multiple access (CDMA) signal;
    transmitting information corresponding to the LTE signal received via the first antenna; and
    performing the quality measurement of the CDMA signal received via the second antenna when the LTE signal is received via the first antenna,
    wherein the transmitted information indicates that a rank indicator (RI) is N, a precoding matrix index (PMI) is selected based on a layer N, and a channel quality indicator (CQI) index is reduced in order to receive the LTE signal via only the first antenna, and wherein the LTE signal has a block error rate (BER) set to a value that is equal to or less than approximately 0.1.

11. A system for controlling a dual-mode terminal in a multiple input multiple output (MIMO) wireless communication system, the system comprising a logic unit configured to:
receive a long term evolution (LTE) signal via first and second antennas;
receive a command for initiating a quality measurement of a code division multiple access (CDMA) signal;
transmit information corresponding to the LTE signal received via the first antenna to the LTE base station; and
perform the quality measurement of the CDMA signal received via the second antenna when the LTE signal is received via the first antenna,
wherein the reported information indicates that a rank indicator (RI) is N, a precoding matrix index (PMI) is selected based on a layer N, and a channel quality indicator (CQI) index is reduced in order to receive the LTE signal via only the first antenna, and
wherein the LTE signal has a block error rate (BER) set to a value that is equal to or lesser than approximately 0.1.

* * * * *